United States Patent

Samman

[19]

[11] Patent Number: 5,822,057
[45] Date of Patent: Oct. 13, 1998

[54] SYSTEM AND METHOD FOR INSPECTING A CAST STRUCTURE

[75] Inventor: Mahmod M. Samman, Houston, Tex.

[73] Assignee: Stress Engineering Services, Inc., Houston, Tex.

[21] Appl. No.: 686,823

[22] Filed: Jul. 26, 1996

[51] Int. Cl.$^6$ ................................................. G01N 21/01
[52] U.S. Cl. ............................................. 356/241; 356/237
[58] Field of Search ................................. 356/241, 237; 348/82, 85

[56] References Cited

U.S. PATENT DOCUMENTS

| | | | |
|---|---|---|---|
| 4,072,427 | 2/1978 | Alsberg | 356/241 |
| 4,281,929 | 8/1981 | Lord et al. | 356/241 |
| 4,657,387 | 4/1987 | Heising et al. | 356/72 |
| 4,696,544 | 9/1987 | Costella | 350/96.26 |
| 4,793,326 | 12/1988 | Shishido | 128/4 |
| 4,848,626 | 7/1989 | Franklin, Jr. | 350/227 |
| 4,967,092 | 10/1990 | Fraignier et al. | 250/560 |
| 5,123,492 | 6/1992 | Lizanec, Jr. | 175/49 |
| 5,275,038 | 1/1994 | Sizer et al. | 73/151 |
| 5,311,639 | 5/1994 | Boshier | 15/324 |
| 5,365,331 | 11/1994 | Tamburrino et al. | 356/241 |

*Primary Examiner*—Frank G. Font
*Assistant Examiner*—Zandra V. Smith
*Attorney, Agent, or Firm*—Matthews, Joseph, Shaddok & Mason, L.L.P.; Henry L. Ehrlich

[57] ABSTRACT

An inspection system and method of the type for visually inspecting the interior of a cast structure is provided. The inspection system includes: an elongated member embedded in a cast structure during casting forming a bore in the structure, an illumination source insertable into the bore via a fiber optic cable, an imaging mechanism insertable into the bore via a fiber optic cable, and a monitoring mechanism for viewing an image transmitted from the imaging mechanism via the fiber optic cable. The elongated member may be removable from the structure forming a bore defined by the structure.

9 Claims, 3 Drawing Sheets

SYSTEM AND METHOD FOR INSPECTING A CAST STRUCTURE

TECHNICAL FIELD

The present invention relates to devices and methods for internally inspecting the integrity of cast or formed structures visually and more particularly to devices and methods for internally inspecting the integrity of cast or formed structures visually that have an elongated member embedded therein during casting forming a bore for inserting a visual inspection device into the structure.

BACKGROUND ART

Most formed structures such as piles, drilled piers, caissons, slabs and bridge spans are constructed in place by casting the structural material, such as concrete, in form works. Some foundation members such as drilled piers are formed by drilling a hole in the ground, placing reinforcement bars ("rebar") and casting the concrete within the hole without the use of any framed form except the soil sides of the hole.

During construction of cast-in-place structures, especially buried ones, defects may form and go unnoticed. Typical construction defects include voids formed in the material during casting, soil encroachment on the structure and inadequate material quality. In addition to construction defects, operational defects may develop due to excessive loading, poor maintenance, erosion and natural disasters. These defects threaten the integrity of the structure and may result in catastrophic failures.

To inspect and ensure the integrity of these vital structural components, destructive and nondestructive testing techniques are utilized. Destructive techniques include taking core samples of the structure for analysis or performing full-scale loading of the structure to verify its structural integrity. Destructive techniques are expensive to conduct, time consuming and may themselves create a weakness or defect in the tested structure.

Nondestructive testing techniques include both active and passive methods. Active testing includes techniques involving ultrasonic pulse transmissions and acoustic wave reflection. Passive testing includes vibration monitoring, acoustic emission, and infrared thermography among other techniques.

Nondestructive testing techniques are popular because they are inexpensive in comparison to destructive methods, they can be conducted in a timely manner and they do not threaten the integrity of the structure. However, these prior art nondestructive testing methods have disadvantages.

One disadvantage is that these testing techniques are more suited for homogeneous materials, whereas, common foundation structures are formed with reinforced concrete composed of many different materials such as cement, sand, aggregate, water and steel. Therefore, these prior testing methods typically only indicate a broad guide to the concrete quality. In addition, the lateral soil density, soil compaction and attached and/or adjacent structures affect the data obtained by these prior art techniques.

Another disadvantage is that to obtain accurate data with these prior art methods and systems a trained staff must conduct the tests. To obtain accurate data with these systems it is required to have information such as the energy wave frequency and velocity of the provided energy source, soil composition surrounding the tested structure, the composition of the tested structure and the dimensions of the structure and the location of the energy source and any and all receiving points. Often this information may be lost and/or change requiring other time consuming and costly tests to obtain adequate information to conduct a thorough and accurate structural integrity test.

A further disadvantage is that most of these prior art inspection tests require direct access to certain sides of the tested structure. Often for structural members such as foundation members and internal beams access cannot be obtained once the structure is in operation. In addition, the structure may have to be taken out of service to conduct the inspection due to the latent "noise" associated with the operational use of the structure.

A still further disadvantage of most of these prior art techniques is that the inspection cannot be performed until the structural material has cured and hardened.

It would be a benefit, therefor, to have a structural inspection system and method which is not limited by the type of material used to form the structure. It would be an additional benefit, to have a system which includes an elongated member embedded within the structure during casting permitting the insertion of a visual inspection device therein when desired for visually inspecting the internal formation of the structure adjacent the bore. It would be a further benefit, to have an inspection system which does not require a specially trained staff to conduct the inspection. It would be a still further benefit, to have a structural inspection system and method which does not compromise the integrity of the structure tested.

GENERAL SUMMARY DISCUSSION OF INVENTION

It is thus an object of the invention to provide a system and method for internally inspecting a cast structure visually that provides an elongated member embedded within a portion of the structure during casting forming a bore in the structure.

It is a further object of the invention to provide a system and method for inspecting a cast structure that provides an illumination source insertable into the bore via a fiber optic cable for illuminating a portion of the structure adjacent the bore.

It is a still further object of the invention to provide a system and method for inspecting a cast structure that provides an imaging mechanism insertable into the bore via a fiber optical cable for forming an image of the structure adjacent the bore.

It is a still further object of the invention to provide a system and method for inspecting a cast structure whereby an image of the structure adjacent the bore is transmitted via the fiber optic cable to a point exterior of the structure to be evaluated in real time and stored for future reevaluation.

Accordingly, an inspection system and method of the type for visually inspecting the interior of a cast structure is provided. The inspection system includes: an elongated member embedded in a cast structure during casting forming a bore in the structure, an illumination source insertable into the bore via a fiber optic cable, an imaging mechanism insertable into the bore via a fiber optic cable, and a monitoring mechanism for viewing an image transmitted from the imaging mechanism via the fiber optic cable.

The inspection system and method may be implemented in combination with any structure, however, it is especially adapted for foundation type structures and load bearing structures wherein a defect may lead to catastrophic failure.

The system and method may be utilized in combination with any structure which is cast or formed of material such as concrete, plastic and other composite materials.

In a preferred embodiment, the inspection system includes a substantially visually transparent tube embedded within a structure during casting, the tube forms a bore between a first open end and a second end. The tube may be rigid or flexible. At least the first end extends external of the structure for inserting the fiber optic system in the tube bore. In a single access installation, only the first end of the tube extends from the structure. In a dual access installation, both the first and second ends are open and extend external of the structure. It is critical that the tube be constructed of a material which is substantially transparent visually. It is also critical that the tube have strength and rheological qualities sufficient to withstand the pressures exerted thereon and the temperatures encountered in the casting and curing processes. The bore formed by the tube must have a diameter sufficient to pass a fiber optic cable therein. Preferably, the tube has an inside diameter of one-half inch or less. The tube should not have an inside diameter greater than one inch in diameter.

The tube may be removable from the structure after it has cured leaving a structural bore defined by the structure. In a removable application it is preferred that the outer surface of the tube have a lubricating coat thereon to facilitate removal of the tube from the structure. The lubricating coat may be a substance such as grease, plastic or rubber. Removal of the tube is also aided by the fact that in a concrete structure, for example, the concrete contracts when curing pulling away from the elongated member.

The tube may be attached to rebar, a reinforcement cage or any substantially rigid member to maintain the tube in a set position while casting the structure. The tube(s) may be set in predetermined positions prior to casting without being attached to reinforcement members. Preferably, a plurality of tubes are set in the structure to allow a thorough internal investigation of the structure. Placement of the open ends of the tube should be made in view of the final design of the structure so that the open ends may be accessed when construction is completed and testing is needed. Covering elements such as caps or plugs may be provided for enclosing the open ends of the tube when the tube is not in use.

The fiber optic cable is insertable into the bore of the tube, the fiber optic cable has an exploratory head and a distal end. The exploratory head carries an illuminating source for illuminating a portion of the structure adjacent the tube and an imaging mechanism for forming an image of the illuminated structure. For use in installations with larger sized tubes it is desirable for the exploratory head to have an articulation mechanism which may be controlled via the fiber optic cable to rotate and bend the head in relation to the cable to ensure that a full radial view of the structure is obtained. Marks in the form of a scale may be formed along the length of the cable to indicate the depth at which the exploratory head is disposed into the structure. The lens of the imaging mechanism may also have hairline marks to indicate the relative size of any defects which are encountered.

A centralizer may also be attached to the cable so as to maintain the cable and the head substantially centered within the bore. Preferably, at least one centralizer is attached to the cable approximate the exploratory head. However, a plurality of centralizers may be attached along the length of the cable.

A monitoring mechanism is positioned external of the structure. The monitor may be any viewing device which allows a user to view the image formed by the imaging mechanism in real time. The imaging mechanism is functionally connected to the monitor so that the image formed may be transmitted via the fiber optic cable.

Preferably, the inspection system includes a storage mechanism functionally connected to the imaging system via the cable. The storage mechanism may be as simple as a video recorder for recording the image formed for future evaluation and as a reference for comparing later evaluations.

A preferred method of visually inspecting a cast structure internally includes the steps of: placing an elongated, substantially visually transparent tube member forming a bore between a first open end and a second end in a frame for a structure to be cast; casting a material into said form and about said tube to form said structure wherein at least said first open end extends external of said structure; emitting a light beam from an illumination source positioned within said tube bore illuminating said structure adjacent said tube, said illumination source being energized by a lighting element positioned external of said structure via a fiber optic cable; forming an image of a portion of said structure adjacent said tube; and transmitting said image via said fiber optic cable to a monitoring mechanism external said structure for evaluation.

This method may further include the step of rigidly connecting the tube to a reinforcement member. The system of this method may further include in part or in to a centralizer connected to the fiber optic cable, a storage mechanism and an articulation mechanism.

After the structure has been cast and before the material has cured the structure may be inspected with the inspection method and system of this invention. This allows the user to determine whether any defects exist as a result of the casting process and allowing the user to remedy any defects before further construction, reducing the cost of the remediation and the likelihood of a catastrophic failure.

In another preferred embodiment of the inspection system a bore is defined by the structure for inserting the inspection device. In this embodiment the structural bore is formed by placing an elongated member in a form for a structure to be cast. Casting a material into the form and about the elongated member. Removing the elongated member from the cast structure forming a bore defined by the structure. The illumination source and imaging mechanism may then be inserted into the structural bore to inspect the structure for defects as described in other embodiments.

The elongated member may be any member having the strength to withstand the casting process such as a metal, plastic or PVC rod or piping. Preferably the elongated member is circular. The elongated member must have an outside diameter sufficient to form a structural bore for inserting the optic fiber inspection system. However, the diameter of the structural bore should not exceed about one inch. Preferably, the outer surface of the elongated member is substantially smooth and non-porous to reduce adhesion of the cast material thereto. The outer surface of the elongated member may have a coat of lubricating substance such as grease, oil, plastic or rubber thereon to facilitate the removal of the member from the structure.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DETAILED DESCRIPTION OF THE PREFERRED EMBODIMENT

Figure 1:
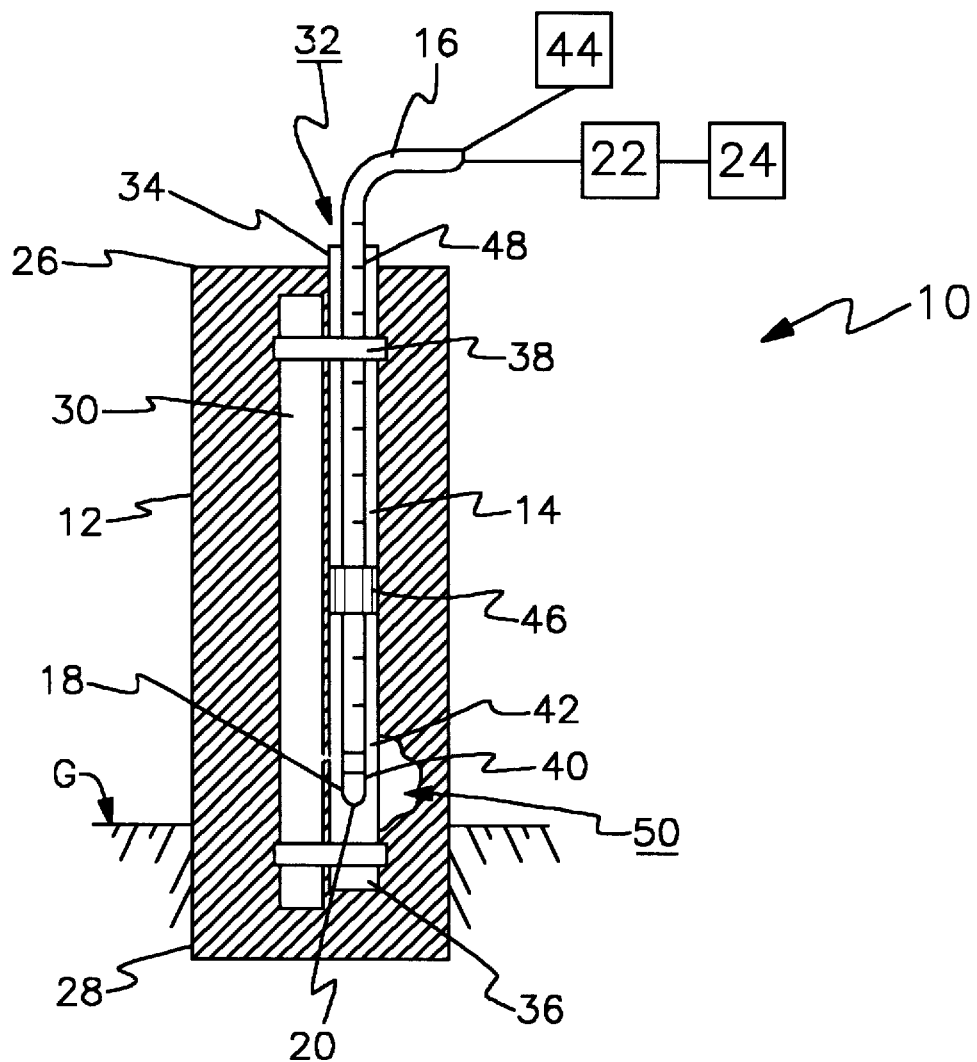
FIG. 1 is a partial cross-sectional, side view of an exemplary embodiment of the inspection system of the present invention.

FIG. 1 is a partial cross-sectional, side view of an exemplary embodiment of the inspection system of the present invention generally designated by the numeral 10. Inspection system 10 includes a cast structure 12, a tube 14, and a fiber optic system including a fiber optic cable 16, an illumination source 18, an imaging mechanism 20, a processing mechanism 22 and a monitoring and storage mechanism 24.

Structure 12 is a pier formed of concrete having a top end 26 and a bottom end 28 disposed into the ground G. Structure 12 is formed by casting a material such as concrete into a form such as the ground or a wooden frame well known in the art (not shown). Structure 12 is strengthened with reinforcement elements 30, in this embodiment element 30 is a reinforcement bar ("rebar") running substantially parallel to the longitudinal axis of structure 12. Structure 12 may be a pier for supporting a bridge span or another structure not shown.

Tube 14 is an elongated, substantially visually transparent member forming a bore 32 between a first open end 34 and a second end 36. At least first open end 34 extends external of structure 12. In other embodiments second end 36 may be open and also extend external of structure 12. Tube 14 is constructed of a substantially rigid plastic or vinyl such as clear polyvinyl chloride ("PVC") or a reinforced acrylic thermoplastic. Bore 32 of tube 14 has an inside diameter of one-half inch. It is critical that tube 14 have a wall thickness sufficient to withstand the forces exerted thereon by the concrete of structure 12 when casting so as not collapse. Tube 14 is rigidly connected to rebar 30 by bands 38 to maintain tube 14 in a set position while casting structure 12.

Fiber optic cable 16 includes an exploratory head 40. Exploratory head 40 carries illumination source 18 and imaging mechanism 20. Exploratory head 40 has an articulation mechanism 42 controlled by an articulation control within processing unit 22 via fiber optic cable 16 for articulating head 40 relative to fiber optic cable 16. Processing unit 22 further includes an optic processor and amplifier for transmitting a clear image from imaging mechanism 20 to monitor mechanism 24.

Illumination source 18 is energized by a lighting element 44 positioned exterior of structure 12 via fiber optic cable 16. Lighting element 44 in this embodiment is a lamp sufficient to illuminate bore 32 and the interior of structure 12 adjacent thereto to a depth approximate second end 36 of tube 14 adequately for imaging mechanism 20 to form a clear, discernable image.

A centralizer 46 is connected to fiber optic cable 16 approximate exploratory head 40 to maintain it substantially in the center of bore 32 to minimize the glare from illuminating source 18 reflected off tube 14.

Imaging mechanism 20 includes a lens, optic chip and a mirror configured in a manner well known in the art.

Imaging mechanism 20 may utilize a straight-view or angled-view lens for quick inspections or selective, detailed inspections respectively. Imaging mechanism 20 forms an image of structure 12 adjacent tube 14 as exploratory head 40 is moved through tube bore 32. Imaging mechanism 20 is functionally connected to monitor and storage mechanism 24 via optical fiber cable 16 for transmitting the image thereto. Monitor and storage mechanism 24 in this embodiment comprises a visual monitor and a video tape recorder.

Fiber optic cable 16 also includes a scale 48 marked thereon to indicate the distance exploratory head 40 is inserted into tube 14. As exploratory head 40 is inserted into tube 14 imaging mechanism 20 transmits an image to monitoring and storage mechanism 24 where the image may be viewed in real time and simultaneously stored for future evaluation. When a defect such as void 50 is encountered a reading may be taken from scale 48 to locate the position of defect 50 within structure 12.

Figure 2:
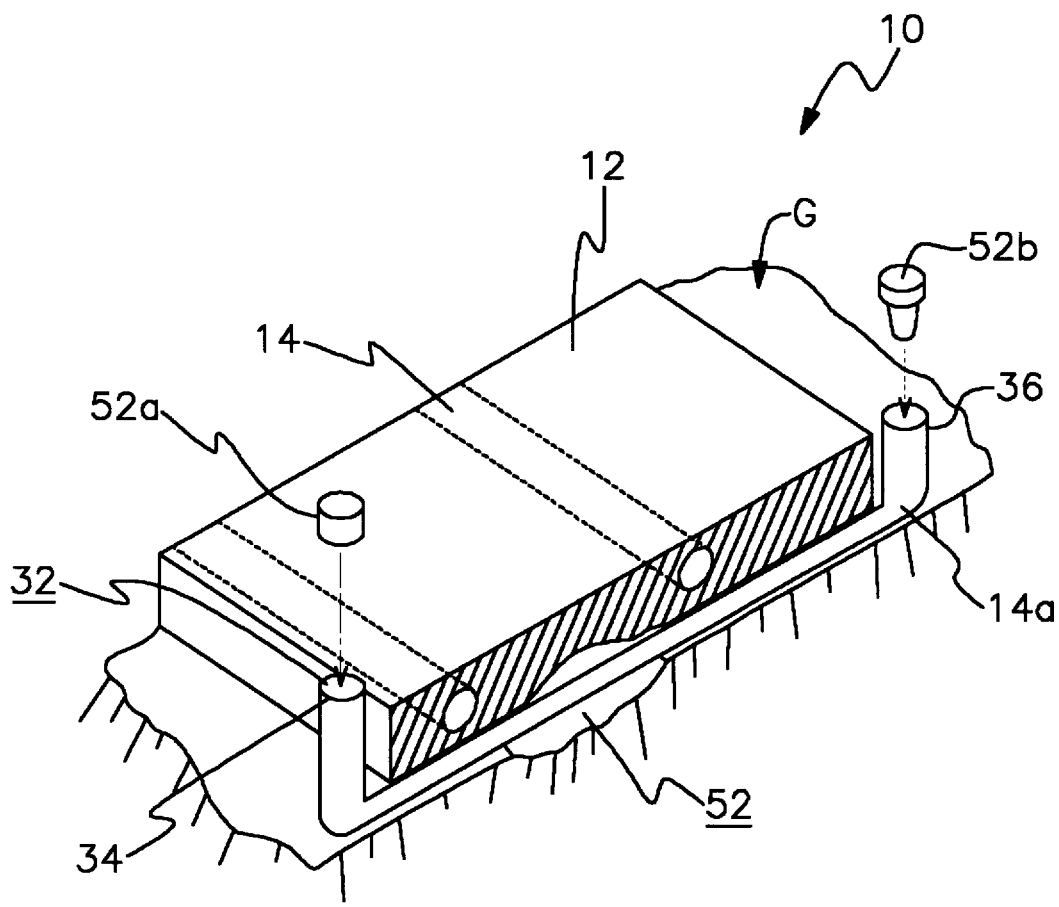
FIG. 2 is a partial cross-sectional, perspective view of another exemplary embodiment of the inspection system of the present invention.

FIG. 2 is a partial cross-sectional, perspective view of another exemplary embodiment of the inspection system of the present invention generally designated by the numeral 10. In this embodiment the elements are of the same construction and have equivalent characteristics of those shown in FIG. 1, thus, the identifying numbers of FIG. 1 are incorporated herein.

This figure shows a cross-sectional view of cast structure 12 formed of concrete as a slab for a foundation. In this embodiment a plurality of tubes 14 and 14a are embedded within structure 12. By reference, and for the sake of brevity and clarity, the fiber optic system of FIG. 1 is incorporated into the embodiment of FIG. 2.

As shown in FIG. 2, tubes 14 and 14a are embedded in structure 12 in a checkerboard fashion to increase the internal portion of structure 12 which may be inspected visually. As shown, tube 14a is embedded in structure 12 so that a portion thereof is exposed to the ground G. In this manner the delamination or erosion defect 52 between ground G and structure 12 may be detected by imaging mechanism 20 of FIG. 1 when passed through tube 14a.

In this embodiment tube 14a has a first and second open end 34,36 providing dual access to bore 32 of tube 14a. A covering element 52 is shown in the form of a cap 52a and a plug 52b. Covering element 52 is adapted for covering open ends 34,36 when structure 12 is not being inspected.

A method for using inspection device 10 with reference to FIGS. 1 and 2 is now described. First, tubes 14 are positioned in a form (not shown) for structure 12 before casting, so that at least a first open end 34 will be positioned exterior of structure 12 when cast. Covering element 52 is connected to open end 34 of tube 14 to prevent obstructing bore 32 when structure 12 is cast. Structure 12 is then formed about tubes 14 by casting or pouring a material such as concrete. Once structure 12 is cast and before the material of structure 12 cures it may be visually inspected internally by removing covering element 52 and inserting a fiber optic system into bore 32 formed by tube 14. A light beam is emitted from illumination source 18 when energized by lighting element 44 via fiber optic cable 16 illuminating structure 12 adjacent tube 14. Lighting element 44 is positioned external of structure 12. An image is formed of structure 12 adjacent tube 14 by imaging mechanism 20 as it is inserted into bore 32 of tube 14. The image is transmitted via fiber optic cable 16 to monitor 22 and storage mechanism 24 for real time viewing and simultaneous storage of the image for future evaluation. Illuminating source 18 and imaging mechanism 20 are removed from tube 14. Covering element 52 is reconnected to open end 34 preventing bore 32 from being obstructed in the future by debris.

Figure 3:
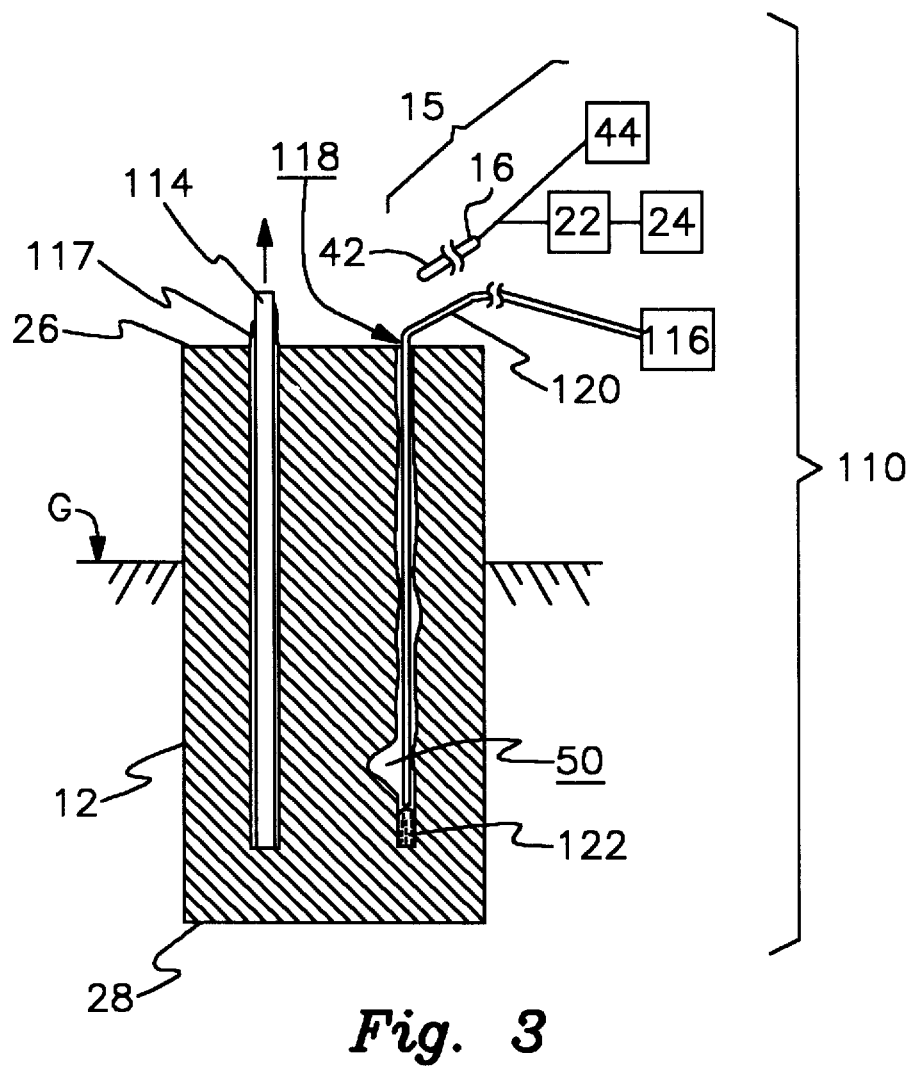
FIG. 3 is a partial cross-sectional, side view of another exemplary embodiment of the inspection system of the present invention.

FIG. 3 is a partial cross-sectional, side view of another exemplary embodiment of the inspection system of the present invention generally designated by the numeral 110. Like elements of FIGS. 1 and 2 have corresponding numbers. Inspection system 110 includes a cast structure 12, an elongated member 114, a fiber optic system 15 and a grouting system 116.

Cast structure 12 is a piling cast of concrete having a top end 26 and a bottom end 28 disposed in the ground G. Cast structure 12 is formed as described above. Elongated member 114 is position in the form for structure 12 before casting. Elongated member 114 may be any elongated member such as tube 14, or a metal or plastic rod or piping. A lubricating coat 117 of grease is disposed on the outer surface of elongated member 114 to facilitate the removal of member 114 from structure 12 when the cast material has cured. When member 114 is removed from structure 12 in the direction shown by the arrow a bore 118 is formed defined by structure 12.

Once elongated member 114 is removed the interior of structure 12 may be inspected by inserting exploratory head 40 of fiber optic system 15 into structural bore 118 in the same manner as described above. Fiber optic system 15 is the same system as that disclosed in FIG. 1.

When a defect such as void 50 is identified grouting system 116 is utilized to correct the defect. Grouting system 116 includes a material tank and a pump connected to piping 120. To correct defect 50 and/or to fill structural bore 118, piping 120 is inserted into bore 118 and a grout 122, such as concrete or any other grouting material, is pumped into structural bore 118. As grout 122 is pumped into bore 118, piping 120 is pulled up through bore 118 until bore 118 is filled.

It can be seen from the preceding description that a system and method for internally inspecting a cast structure visually which has an elongated member embedded within a portion of the structure during casting forming a bore in the structure, an illumination source insertable into the bore via a fiber optic cable for illuminating the portion of the structure adjacent the bore, an imaging mechanism insertable into the bore via a fiber optical cable for forming an image of the structure adjacent the bore, and whereby an image of the structure adjacent the bore is transmitted via the fiber optic cable to a point exterior of the structure to be evaluated in real time and stored for future reevaluation has been provided.

It is noted that the embodiment of the system and method for inspecting a structure described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method of visually inspecting a cast structure internally comprising the steps of:

positioning an elongated member in a form for a structure to be cast;

casting a material about said elongated member forming said structure;

removing said elongated member from said structure forming a bore defined by said structure;

emitting a light beam from an illumination source positioned within said bore illuminating said structure adjacent said bore, said illumination source being energized by a lighting element positioned external of said structure via a fiber optic cable;

forming an image of a portion of said structure adjacent said bore; and transmitting said image via said fiber optic cable to a monitoring mechanism external said structure for evaluation.

2. The method of claim 1, further including the step of:

transmitting said image via said fiber optic cable to a storage mechanism.

3. The method of claim 1, further including the step of:

coating an outer surface of said elongated member with a lubricating substance before casting said material for facilitating removal of said elongated member from said structure.

4. The method of claim 3, further including the step of:

transmitting said image via said fiber optic cable to a storage mechanism.

5. An inspection system for internally inspecting a cast structure visually, said inspection system comprising:

an elongated member having a lubricating coat on an outer surface thereof removably embedded within a structure during casting forming a bore defined by said structure when removed from said structure;

a fiber optic cable insertable into said structural bore, said fiber optic cable having an exploratory head;

an illumination source carried by said exploratory head for illuminating a portion of said structure adjacent said structural bore;

an imaging mechanism carried by said exploratory head for forming an image of said structure adjacent said structural bore; and a monitoring mechanism positioned external of said structure in functional connection with said imaging mechanism for viewing said image transmitted via said fiber optic cable from said imaging mechanism.

6. The inspection system of claim 5, further including:

a storage mechanism positioned external of said structure, said storage mechanism functionally connected to said imaging mechanism for storing said image transmitted therefrom via said fiber optic cable.

7. The inspection system of claim 5, wherein:

said exploratory head has an articulation mechanism for articulating said head relative to said fiber optic cable.

8. The inspection system of claim 5, further including:

a centralizer connected about said fiber optic cable.

9. An inspection system for internally inspecting a cast structure visually, said inspection system comprising:

an elongated member having a lubricating coat on an outer surface thereof removably embedded within a structure during casting forming a bore defined by said structure when removed from said structure;

a fiber optic cable insertable into said structural bore, said fiber optic cable having an articulating exploratory head;

an illumination source carried by said exploratory head for illuminating a portion of said structure adjacent said structural bore;

an imaging mechanism carried by said exploratory head for forming an image of said structure adjacent said structural bore;

a monitoring mechanism positioned external of said structure in functional connection with said imaging mechanism for viewing said image transmitted via said fiber optic cable from said imaging mechanism; and a storage mechanism positioned external of said structure, said storage mechanism functionally connected to said imaging mechanism for storing said image transmitted therefrom via said fiber optic cable.

* * * * *